United States Patent [19]

Blegen

[11] 4,374,167

[45] Feb. 15, 1983

[54] VAPOR PERMEATION CURABLE POLYESTER RESIN COATING COMPOSITIONS FOR FLEXIBLE SUBSTRATES

[75] Inventor: James R. Blegen, Worthington, Ohio

[73] Assignee: Ashland Oil, Inc., Dublin, Ohio

[21] Appl. No.: 365,603

[22] Filed: Apr. 5, 1982

Related U.S. Application Data

[62] Division of Ser. No. 216,323, Dec. 15, 1980, Pat. No. 4,343,839.

[51] Int. Cl.³ .................. B32B 3/26; B32B 27/40; C08G 18/42; B05D 3/10
[52] U.S. Cl. .................................. 428/141; 428/142; 428/143; 428/145; 428/147; 428/150; 428/151; 428/331; 428/336; 428/423.1; 428/424.2; 428/424.4; 428/425.6; 428/442
[58] Field of Search .................. 260/22 TN; 427/340, 427/342, 393.5; 525/445; 528/80, 83, 67; 524/377, 773, 872; 428/141, 411, 145, 147, 143, 331, 424.2, 424.4, 423.1, 336, 442, 142, 150, 151, 425.6

[56] References Cited

U.S. PATENT DOCUMENTS

| | | | |
|---|---|---|---|
| 2,657,151 | 10/1953 | Gensel | 427/340 |
| 2,967,117 | 1/1961 | Arledter et al. | 427/340 |
| 3,409,579 | 11/1968 | Robins | 260/30.4 |
| 3,429,848 | 2/1969 | Robins | 260/38 |
| 3,676,392 | 7/1972 | Robins | 260/38 |
| 3,789,044 | 1/1974 | Taft et al. | 260/18 TN |
| 3,822,226 | 7/1974 | Taft et al. | 260/18 TN |
| 3,836,491 | 9/1974 | Taft et al. | 260/22 TN |
| 3,874,898 | 4/1975 | McInnes | 427/340 |
| 3,933,727 | 1/1976 | Schmid | 260/37 N |

FOREIGN PATENT DOCUMENTS 1351881 5/1974 United Kingdom .
1369351 10/1974 United Kingdom .

*Primary Examiner*—Ellis P. Robinson
*Attorney, Agent, or Firm*—Mueller and Smith

[57] ABSTRACT

Disclosed is a coating composition rapidly curable at room temperature in presence of a vaporous tertiary amine catalyst and possessing a flexibility sufficient for a zero-T bend on metal and a mar resistance of at least about 2,000 grams as borne by the edge of a nickel passed on said film. The coating composition is a phenolic-terminated-polyester and multi-isocyanate curing agent (at least about 10% aromatic isocyanate content) dispersed in a fugitive organic solvent, and a mar-resisting aid of an organic compound physically incompatible in said coating composition and having an effective chain length of at least about 12 carbon atoms. Application of the coating composition preferably is on a flexible substrate such as a thermoplastic substrate.

14 Claims, No Drawings

VAPOR PERMEATION CURABLE POLYESTER RESIN COATING COMPOSITIONS FOR FLEXIBLE SUBSTRATES

CROSS-REFERENCE TO RELATED APPLICATIONS

This application is a division of application Ser. No. 216,323, filed Dec. 15, 1980 now U.S. Pat. No. 4,343,839.

BACKGROUND OF THE INVENTION

The present invention relates to polyester resins cured with isocyanate cross-linking agents and more particularly to such a system which is curable in the presence of a vaporous tertiary-amine catalyst and is especially adapted for application to flexible substrates.

Vapor Permeation Cure (VPC) has been proposed to a limited basis by the prior art. For example, U.S. Pat. No. 2,967,117 shows a coating composed of a polyhydroxy polyester and a polyisocyanate which are cured in the presence of a gaseous tertiary amine or phosphine. The polyester contains aliphatic hydroxyl groups and heating of the coated substrate at about 60°–120° C. prior to or concomitant with the vaporous tertiary amine exposure is taught in the specification and examples. U.S. Pat. No. 3,874,898 shows a coating composed of a polymer containing only isocyanate functionality which can be cured in the presence of a vaporous amine. VPC technology additionally has been used for curing foundry binder compositions of a phenol-aldehyde resin (U.S. Pat. No. 3,409,579). For coatings applications, a hydroxy functional polyester may be end-capped with hydroxybenzoic acid as taught in U.S. Pat. No. 3,836,491, a phenol reacted with an unsaturated resin as taught in U.S. Pat. No. 3,822,226, or an epoxy polymer capped with hydroxybenzoic acid as taught in U.S. Pat. No. 3,789,044. British Pat. No. 1,351,881 modifies a polyhydroxy, polyepoxy, or polycarboxyl resin with the reaction product of a phenol and an aldehyde. The reaction product is curable with an isocyanate cross-linking agent in the presence of a vaporous tertiary amine. British Pat. No. 1,369,351 proposes a hydroxy or epoxy compound which has been reacted with diphenolic acid. The resulting compound is curable with a polyisocyanate according to VPC techniques.

For application on flexible substrates, such as flexible vinyl substrates, it has been determined that resins capped with hydroxybenzoic acid and phenol-aldehyde resins do not provide acceptable properties. The same would be expected to be true of resins containing only isocyanate functionality. The diphenolic acid-capped polyester coating composition of British Pat. No. 1,369,351 provides only minimal performance requirements based upon the particular polyester resins disclosed therein.

Suitable coating compositions for use on flexible substrates must meet certain minimum performance specifications prior to being acceptable. These performance specifications include mar resistance, abrasion resistance, flexibility, good color retention, and even embossability on occasion. Acceptable coating compositions additionally must retain attributes of acceptable conventional coating compositions including flow, leveling, pot life, high non-volatile solids content, acceptable application viscosity, acceptable gloss, and like coatings properties. Moreover, since many thermoplastic substrates can be damaged by exposure to too much heat or too prolonged heating, acceptable coatings compositions for such substrates must be curable at low temperature.

The present invention provides a coating system which meets or exceeds all performance requirements outlined above for flexible substrates as well as retains application and other conventional coating characteristics. Moreover, the coating system of the present invention is fully curable at room temperature for minimizing heat damage to the flexible substrate to which it is applied. Additional advantages of the coating system of the present invention is that such system, with at most modest variation, is entirely suitable for application to exterior substrates. Such coating system provides requisite toughness, exterior durability, adhesion including adhesion to metal, resistance to UV degradation, and the like, which properties are necessary for providing a suitable exterior coating. The truly unique coating system which possesses these and other advantages will be appreciated by the skilled artisan according to the disclosure contained herein.

BROAD STATEMENT OF THE INVENTION

The present invention is a coating composition which is rapidly curable at room temperature in the presence of a vaporous tertiary amine. The cured film of the coating composition possesses good color retention, a minimum flexibility of sufficient for a zero T-bend on metal, and a minimum mar resistance of at least about 2,000 grams as borne by the edge of a nickel passed over said cured film. The coating composition comprises:

(A) an aromatic hydroxyl-terminated condensation product having an acid number of less than about 10 and made by condensing the following ingredients in the indicated molar proportions or double thereof except for the diphenolic-type acid:
  (1) between 1 and 2 moles of a $C_2$–$C_{12}$ aliphatic dibasic acid,
  (2) between about 1 and 2 moles of an ortho or meta aromatic dicarboxylic acid or anhydride thereof,
  (3) between 1 and 4 moles of a $C_2$–$C_6$ alkylene glycol,
  (4) between 1 and 2 moles of a sterically hindered diol,
  (5) between 1 and 2 moles of an epoxy or diol having a pendent hydrocarbyl group and
  (6) between 1 and 2 moles of a diphenolic-type acid,
(B) a multi-isocyanate comprising:
  (1) between about 10 and 80 percent by weight of an aromatic multi-isocyanate, and
  (2) between about 90 and 20 percent by weight of an aliphatic multi-isocyanate,
(C) a volatile organic solvent for such condensation product and for said multi-isocyanate, and
(D) a mar-resisting agent of an organic compound physically incompatible in said coating composition and having an effective chain length of at least about 12 carbon atoms.

The ratio of the aromatic hydroxyl equivalents of said condensation product to the isocyanate equivalents of said multi-isocyanate is between about 1:1 and 1:1.7. Additionally, the condensation product contains substantially no aliphatic hydroxyl groups. Desirably, the non-volatile solids content of the coating composition ranges up to about 50±3% by weight at application viscosity.

DETAILED DESCRIPTION OF THE INVENTION

As with all coatings compositions, a balance of properties must be struck in order to achieve diverse properties which are mandatory therefor. The performance requirements which the coating system of the present invention must meet includes very diverse requirements. For example, for coatings intended to be applied to flexible vinyl substrates, the coating must be resistant to marring and abrasion while providing extreme flexibility. Such performance requirements are not necessarily compatible. Of course, adhesion to the substrate by the coating underlies both of these factors. Additionally, the coating must be resistant to chemicals such as, for example, fingernail polish, lipstick, tea, coffee, fingernail polish remover, and like household chemicals when the flexible vinyl substrate is intended as a wallcovering or laminate on particle board, wood, metal and the like. For such use, the coating also must be clear and bright and resistant to yellowing and degradation under the influence of ultraviolet radiation. All of these and additional performance requirements must be met by a film whose thickness ranges from about 0.1 to about 0.5 mils. Clearly, an unusual coating is required.

Besides the foregoing performance requirements, unexpectedly, it was discovered that the coating system developed for flexible vinyl substrates could be satisfactorily used for exterior application where exterior durability, toughness, and adhesion to metal becomes very important. Moreover, exterior durability and flexibility include resistance to extreme changes in temperature. A coating system which is adapted to perform for interior and exterior application clearly is a unique coating. It should be mentioned also that the coating system of the present invention can be embossed for special aesthetic appeal of the coating whether in use on flexible substrates or as an exterior coating.

Besides the excellent properties which the coating system of the present invention possesses, the coating can be cured at room temperature which provides a special economic savings during these energy-conscious times. The coating system of the present invention can be cured in as short a time as a few seconds on up to 15 to 30 seconds or thereabouts. Thereafter, the coating is tack free and does not block so that the coated substrate can be immediately handled for packaging and/or further processing. Moreover, the use of vapor permeation curing for the present coating eliminates the need for capital-intensive equipment such as required for ultraviolet radiation curing. Despite the rapid cure times which are required for curing a film of the coating composition of the present invention, the polyester and isocyanate cross-linking agent dispersed in a volatile organic solvent possesses excellent pot life often in the absence of pot life extender additives. Pot lives for the coating composition of the present invention often can range up to days and even weeks in the absence of the tertiary amine catalyst. The expediency of commercial utilization of the present coating composition having such extended pot life clearly can be appreciated.

The first component of the coating composition is an aromatic hydroxyl-terminated linear condensation product which has an acid number of less than about 10 and preferably between about 6 and 10. The polyester should contain substantially no aliphatic hydroxyl groups as aliphatic groups decrease the pot life of the composition and retard the rapid cure otherwise attainable with aromatic hydroxyl groups. The ingredients of the polyester have been chosen in order to confer desired properties required of the coating composition. The first ingredient of the polyester is a $C_2$-$C_{12}$, advantageously $C_4$-$C_{10}$, linear aliphatic dibasic acid. A preferred dibasic acid is adipic acid in a proportion of 1-2 moles per molecule and preferably 2 moles. The aliphatic dibasic acid provides flexibility to the coating composition without the film becoming excessively soft and cheesy. The next ingredient of the polyester is an aromatic dicarboxylic acid or anhydride thereof which ring structure provides hardness, resistance to water and chemicals, and durability to the coating composition. Resistance to sun or ultraviolet radiation is enhanced also probably because of the energy dissipation due to the double bond isomerization in the structure. The meta structure or isophthalic acid is preferred because it confers more stable ester linkages. Orthophthalic acid also is acceptable. The para structure or terephthalic acid should be avoided, though minor amounts (e.g. up to about 15%) of terephthalic acid can be contained in the preferred isophthalic acid. The proportion of isophthalic acid broadly is between about 1 and 2 moles and preferably 1 mole per molecule. Note that when longer chain linear dibasic acids are used, e.g. $C_9$ and $C_{10}$ linear dibasic acids, the proportion of isophthalic acid should be about 2 moles and the proportion of linear dibasic acid should be 1 mole. The balance of hardness contributed by the isophthalic acid and the softness contributed by the linear dibasic acid is maintained thereby.

Diols are the preferred majority polyfunctional alcohol for use in the polyester in order to keep the viscosity minimized and solids maximized in a flexible film structure. Ethylene glycol may be used, though the resulting ester linkages are not outstandingly stable. Propylene glycol is a glycol of choice for use in the polyester as the linkages formed therewith are adequate for modest resistance to hydrolytic degradation found in most end uses, it is relatively inexpensive and does not cause crystallinity problems in polyester polymers (as ethylene glycol has a propensity to cause). The proportion of propylene glycol broadly ranges from about 1 to 4 moles per molecule and preferably about 1 mole. A second diol ingredient desirably is included in the polyester structure also. Such diol should be a sterically hindered or shielded diol in order to confer a high order of hydrolytic stability and weather resistance to the coating composition. The preferred sterically hindered diol is neopentyl glycol, though other sterically hindered diols such as, for example, Ester Diol 204 (Union Carbide and Chemical Company), cyclohexane dimethanol, and the like could be used. The proportion of sterically hindered diol should range between 1 and 2 moles per molecule and preferably 2 moles. Note that a minor proportion of tri-functional polyols, such as trimethyol propane could be used if the consequent lowering of resin solids can be tolerated. Also, appreciable use of excess polyol is not desirable because residual aliphatic hydroxyl groups shorten the pot life of the coating composition and are retardant toward the otherwise rapid room temperature cure which is experienced in the coating composition of the present invention.

The next ingredient of the polyester is a mono-epoxide or glycol having a pendant hydrocarbyl group which enhances the compatibility and solubility characteristics of the polymer with other hydrocarbons. Suitable mono-epoxides and glycols can be optionally substituted with aromatic or other groups and should contain at least one pendant hydrocarbyl group, preferably ranging in chain length from between about 8 and 22 carbon atoms. Thus, advantageous mono-epoxides are epoxides of $C_8$-$C_{22}$ mono-olefins (e.g. a $C_{16}\alpha$-olefin epoxide) and advantageous glycols are 1,2-glycols containing a $C_8$-$C_{22}$ pendant hydrocarbyl group. The preferred ingredient is an epoxy-ester, such as, for example, Cardura E, a glycidyl ester of Versatic 911 acid (Cardura and Versatic being trademarks of Shell Chemical Company, New York, N.Y.). Versatic 911 is reported to be a mixture of aliphatic, mostly tertiary, acids with 9-11 carbon atoms. The epoxy-ester further enhances flow and leveling of the coating composition during application and increases adhesion of the cured film of the coating composition to metal. The proportion of the mono-epoxide or glycol should be between about 1 and 2 moles per molecule and preferably 1 mole.

The final ingredient of the polyester is a phenolic-capping agent which provides pendant or terminal aromatic hydroxyl groups for the polyester. The functional reactivity on the phenolic capping agent which links the agent into the polyester conceivably could be hydroxyl, amine, unsaturation or the like, providing that groups reactive therewith are included in the other ingredients of the polyester. Preferably, though, such functional reactivity is a carboxyl group for providing a phenolic-functional carboxylic acid (or ester) capping agent. Note that all carboxylic acid ingredients of the polyester could be esters (e.g. alkyl esters) and such esters used to incorporate the ingredient into the polyester.

Advantageous phenolic-functional carboxylic acids for use in the present invention can be represented conventionally by the following general structure:

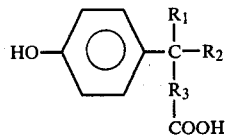

where
$R_1$ is hydrogen, an aromatic group, or an aliphatic group,
$R_2$ is hydrogen, an aromatic group, an aliphatic group, or a phenolic group, and
$R_3$ is a divalent organic radical or a sigma bond,
$R_1$ preferably is an H or alkyl group, $R_2$ preferably is a phenolic group, and $R_3$ preferably is a sigma bond or a divalent $C_1$-$C_8$ polymethylene group, optionally substituted with $C_1$-$C_8$ alkyl groups. Thus, the preferred phenolic-functional carboxylic acids can be represented conventionally as follows:

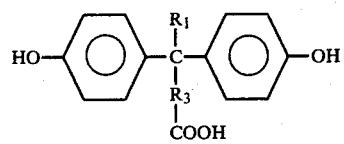

where:
$R_1$ is an H, $C_1$-$C_8$ alkyl group,
$R_3$ is a sigma bond or a $C_1$-$C_8$ polymethylene group.

Representative preferred diphenolic-type acids include, for example, diphenolic acid, bis-phenol acetic acid, p-hydroxyphenyl acetic acid, and the like.

The proportion of mono-phenol capping agent is (at least) 2 moles per molecule and of di-phenol capping agent is between 1 and 2 moles and preferably 2 moles. Preferably, the polyester is terminated at both ends with at least one phenol group. The aromatic hydroxyl groups of the capping agent contribute to extremely long pot lives of the coating composition as well as rapidly cross-link with the isocyanate cross-linking agent in the presence of the vaporous tertiary amine catalyst. It should be understood that the foregoing molar proportions or equivalents of the ingredients used to synthesize the polyester are preferred for use in the present invention. It should be recognized, however, that all of the ingredients (except for the diphenolic-type acid) may be doubled in proportion (per molecule) in order to provide a polyester chain of about twice the length or molecular weight of that polyester described above. Such doubling of the components provides a polyester resin which is suitable for use in coating flexible substrates according to the preferred embodiment of the present invention. It should be noted that increasing the ingredients further is undesirable as the cured film of the coating composition becomes excessively soft and cheesy with attendant loss of mar and abrasion resistance.

Synthesis of the polyester resin is conventional so that little more need be said about it. It should be noted, though, that on occasion it may be preferred to conduct the polyesterification reaction with all of the listed ingredients except the diphenolic-type acid to produce a polyester having an acid number of less than about 10 and then add the diphenolic-type acid in order to ensure its placement at the terminal end of the linear polyester chain for providing the preferred aromatic hydroxyl functionality. It should be recognized also that in synthesizing the polyester, the specified acids may be in the form of anhydrides, esters (e.g. alkyl esters) or like equivalent form.

The next component of the coating composition is a multi-isocyanate cross-linking agent which cross-links with the aromatic hydroxyl groups with the polyester under the influence of a vaporous tertiary amine to form urethane linkages and to cure the coating. Aromatic isocyanates are necessary in order to obtain the desired rapid catalysis with the vaporous tertiary amines at room temperature. In order to minimize the initial color as well as the discoloration due to sunlight, it is desirable to use a moderate level of aliphatic isocyanate. Of course, polymeric-isocyanates are employed in order to reduce toxic vapors of isocyanate monomers. Further, alcohol-modified, epoxy-modified, and other modified isocyanate compositions find utility in the invention. Another important consideration in choice of the isocyanates for use in the coating composition is that the viscosity of the coating composition should remain low while non-volatile solids should remain high. The choice of isocyanate used in the coating composition clearly will affect these latter considerations. Broadly, then, the proportion of aliphatic isocyanates can range up to about 90 percent maximum and still the desired 15-30 second room temperature cure time will be maintained. Some present day isocyanate cross-linking packages contain aromatic and aliphatic polyisocyanate polymers such as, for example, Mondur HC (the reaction product of hexamethylene diisocyanate and toluene diisocyanate, Mobay Chemical Company). Such mixed isocyanate cross-linking agents may be used in the coating composition of the present invention, especially when blended with an aliphatic isocyanate such as, for example, an aliphatic polyfunctional isocyanate of the hexamethylene diisocyanate biuret type, to provide the desired equivalents of aliphatic and aromatic isocyanate functionalities. The proportion of aromatic and aliphatic polyisocyanates used in the coating composition preferably is about 25% equivalent aromatic isocyanate and 75% equivalent aliphatic isocyanate. If desired, additional flexibility may be built into the coating composition by use of flexible aliphatic polyisocyanates such as, for example, methylene-based aromatic diisocyanates as typified by a Mobay XP-743 and XP-744. Between about 1 and 25 percent of the isocyanate equivalent in the coating composition may come from such isocyanate flexiblizing modifier.

The ratio of aromatic hydroxyl equivalents from said condensation product to the isocyanate equivalents of the multi-isocyanate cross-linking agent should be greater than 1:1 and can range on up to about 1:2. Advantageously, though, such ratio is between about 1:1.1 and 1:1.3. At low cross-link densities, the cured film lacks good abrasion resistance and probably humidity resistance. Conversely, at high cross-linking densities, harder but relatively inflexible films are produced. While the mar resistance may be enhanced as the ratio of isocyanate equivalents to hydroxyl equivalents goes up from 1.0:1.1, flexibility can decrease to an unacceptable extent. Flexibility appears to be optimized at an NCO/OH ratio of between about 1-1.1:1 while mar resistance and cure speed appear to be optimized at about 1.3-1.7:1. Thus, the preference for maintaining the NCO/OH ratio above stoichiometric, e.g. about 1.1-1.3:1.

In order to achieve the remarkable mar resistance which cured films of the coating composition possess, it has been found necessary to include a mar resistance or slip agent in the coating composition. Initial work in developing the coating composition determined that traditional conventional silicone oils and surfactants did not contribute substantially, if at all, to increasing the mar resistance of the cured film. The same is true of polyethylene glycol waxes as well as a variety of other proprietary slip agents tested. An agent which eventually proved quite satisfactory for use in the coating composition is a long chain hydrocarbon ester manufactured under the trademark Starfol CG (Sherex Chemical Company, Inc.). Other long chain fatty-type compounds function also. It appears that the preferred long chain fatty esters have a sufficient degree of incompatibility to rise to the surface of the applied film, yet are compatible enough to be retained in the cured solids via hydrogen bonding or other phenomena. By incompatible is meant that the mar-resisting aid in the coating composition forms a turbid solution and typically is subject to phase separation from the liquid coating composition upon standing for a time. In any event, such long chain physically incompatible compounds, for example, $C_{12}$–$C_{30}$ esters and preferably terminal esters, are the only agents tested which provide the necessary degree of mar and abrasion resistance required of the coating composition of the present invention. The proportion of such agent used in the coating composition ranges from about 0.5% to about 1.5% by weight of the non-volatile solids. Additional conventional additives such as leveling agents and the like may be used in the coating composition as is necessary, desirable, or convenient in order to comply with the particular coating application requirements desired.

The solvent or vehicle for the coating composition is a volatile organic solvent mixture which preferably includes ketones and esters for minimizing viscosity of the composition. Some aromatic solvents may be necessary and typically are a part of the volatiles in commercial isocyanate polymers. For the polyester resin, suitable solvents include, for example, methyl ethyl ketone, acetone, methyl isobutyl ketone, ethylene glycol monoethyl ether acetate (sold under the trademark Cellosolve acetate) and the like. Some solvents can be too volatile so that mixtures may be preferred. For the polyisocyanate, conventional commercially available solvents therefor include toluene, xylene, Cellosolve acetate, and the like. Such aromatic solvents are quite compatible with the preferred ketone and ester solvents for the polyester resin when the two packages are mixed together in the pot. Sufficient solvent is added in order to bring the non-volatile solids content to the coating composition down to about 50±3% by weight at application viscosity. It should be noted that the effective non-volatile solids content of the coating composition can be increased by incorporation of a relatively low or non-volatile (high boiling) ester plasticizer which is retained for the most part in the cured film. Suitable such ester plasticizers include, for example, dibutyl phthlate, di(2-ethylhexyl) phthlate [DOP], and the like. The proportion of ester plasticizer should not exceed about 5–10% by weight, otherwise loss of mar resistance can occur. One decided benefit of the high boiling plasticizer, though, is increased scuff-resistance of the cured coating.

The coating composition as described above is a flexible, yet mar resistant clear coating primarily intended for application at film thicknesses ranging from about 0.1 to 0.5 mils. For some uses of the coating composition, it is desirable to flatten the very high gloss which the coating composition has. An example of such need would be when the coating is applied to woodgrain vinyl substrates. Often, manufacturers require relatively low gloss of about 8–14 on a 60° head for such use. During initial work on the present invention, a variety of techniques were tried in order to reduce the high gloss of the coating composition. Acrylic and other incompatible materials proved unsatisfactory as did polyethylene and polypropylene beads. Silica flatting agents proved very successful, but only when the particle size of the silica was less than the thickness of the film of the coating composition. Thus, silica flatting agents with a mean particle size of around 3 microns work very well in the coating composition, whereas silica flatting agents with a mean particle size of about 5 microns average or higher are undesirable. The proportion of silica flatting agent depends upon the required final gloss of the coating and generally about 2.5% to about 10% silica flatting agent finds use for commercial application of the coating composition.

As to the performance requirements which are met by the coating composition, it should be noted the coating composition, polyester resin and isocyanate cross-linking agent, have a minimum pot life of at least 4 hours in an open pot and generally the pot life exceeds 8 hours and can range up to 18 hours and more. Such long pot lives means that refilling the pot at the plant during shifts generally is not required. Moreover, the pot life of the coating composition in a closed container generally exceeds one month. After storage of the coating composition, the stored composition can be cut to application viscosity with suitable solvent and such composition retains all of the excellent performance characteristics which it initially possessed. Such long pot lives means that it is unnecessary to use a two-head spray unit or the like for applying the coating composition which spray units have been considered to be a health hazard.

The composition of the present invention can be cured in the presence of a tertiary amine such as, for example, triethylamine, dimethyl ethylamine, methyl diethylamine, and the like, by exposure thereto for about 5–30 seconds. Some formulation adaptations may be cured in as short as 5 seconds, though generally the curing time ranges from between about 15–30 seconds during commercial scale practice of the present invention. The coating composition thus cured may immediately be rolled up without fear of tackiness or blocking of the cured film. Moreover, it also is possible to mildly heat the cured coating composition for embossing such composition. The cured film of the present invention accepts an emboss exceptionally well, for example, on a heated roll. It should be noted, however, that post thermal cure of the VPC cured coating is unnecessary since testing has indicated that mar resistance, etc. of the coating does not significantly, if at all, increase thereby, nor does such heating result in expelling solvent from the cured film.

The performance requirements noted above are quite desirable for the present coating composition in its preferred use for coating vinyl or flexible substrates. These performance requirements include mar resistance and resistance to scratching and scraping. This requirement is important because the film can be marred while being applied to cupboards, cabinets, and the like and can be marred because the coated vinyl substrate can be used as a work surface on a table, a cabinet, or appliance. Another important performance requirement is abrasion-resistance which can be important because often a light, but continued abrasion pressure will be applied to the coating, for example, by sliding books into a book case over the coated vinyl substrate. Another important performance requirement is toughness and flexibility. The cured film should initially withstand the creasing and double creasing of making corners, such as on cabinets. Also, the coating must withstand flexing in "accordion-type" doors which puts a repeated flex demand on the coating. Next, the coating should remain permanently adhered to the vinyl or flexible substrate without delamination thereof. Further, the coating composition must be resistant to chemical staining as occurs from water, alcohol, fingernail polish, and like household chemicals which may be spilled on the coated vinyl or other flexible substrate. Also, normal sunlight or lack thereof should not discolor the coating. These performance requirements will be adequately demonstrated in the examples which follow.

In practicing the present invention, the coating composition is applied to the flexible substrate preferably by direct roll coat or curtain coating with or without knife since transfer efficiency is near 100%, although reverse roller coat, atomized application, or the like may be used. After the thin film is applied to the substrate, the coated substrate is passed through a zone or region which contains the vaporous tertiary amine. Representative presently preferred commercial curing chambers for vapor curing the coating include those shown in U.S. Pat. Nos. 3,851,402, and 3,931,684, the disclosures of which are expressly incorporated herein by reference. The vaporous tertiary amine often is admixed with a carrier gas, such as an inert gas like nitrogen or carbon dioxide, in order to facilitate its dispersion in the curing chamber as well as minimizing the chance for explosion. The saturated atmosphere in the curing chamber normally will contain the vaporous tertiary amine in a proportion of between about 2 percent and 12 percent with catalyst concentrations somewhere in the range of 4–8 percent being optimum. Room temperature may be maintained during the entire sequence of operations from coating, curing, and takeup of the coated substrate. Room temperature curing of the coating is a decided benefit of the process since most thermoplastic flexible substrates are quite sensitive to heat.

The following examples show how the present invention can be practiced, but should not be construed as limiting. In this application, all units are in the metric system.

IN THE EXAMPLES

In the examples, the following test methods were employed.

Mar Resistance

1. Finger nail mar resistance involved frequent rubbing of the coated substrate with a finger nail. The coated surface then was examined and graded for scratch marks on a scale of 0 to 5 with 0 indicating that the surface was scratched easily and 5 indicating that the surface could not be scratched. A value of at least about 4 is desired.

2. Nickel cart test (of PPG Industries) consisted of a 7.46 cm (2-15/16") by 9.84 cm (3⅞") weighted platform supported at the ends of a 7.30 cm (2⅞") long rod which passes through the centers of 2 nickel coins which are about 5.08 cm (2") apart. The coins were permanently mounted so that they could not roll when the cart was pulled. Coated substrate samples were tested by pulling the cart weighted with 4567 gms of weight over the surface and grading the surface with the 0 to 5 scale used in the finger nail mar resistance test. Again, a value of at least about 4 is desired.

3. Paper clip test (General Motors Corporation, Fisher Body Division, Test Method No. 30-22 of July 10, 1961) utilized the General Motors Paper Clip mar resistance tester weighted with 1,000 gms on the pressure bar. The tester was pulled across the coated substrate and the tracks of the stationary paper clip were examined. Any marks left on the surface by the paper clip meant that the coating had failed the test.

Abrasion Resistance

Abrasion resistance of coated samples was determined in accordance with ASTM test method D1044-73. The coated samples were mounted on specimen mounting cards and tested on a Taber Abraser using Calibrase CS-17 wheels at 1,000 gm loads. The coating should achieve 200–300 cycles in order to pass this test.

"O"-T Bend Flexibility

This flexibility test involved attaching coated substrate samples to Q-Panels D-46 steel panels (10.16 cm by 15.24 cm by 0.0254 cm) with a room temperature curable pressure sensitive adhesive. The test panel then was bent 180° with the coated surface out and pressed in a Carver hydraulic press under a load of 2250 kg for 30 seconds so that there was no air gap between the two sides of the bent panel. The bent edge of the panel was examined for breaks and cracks. The coatings were rated on a 0 to 5 scale with 0 indicating cracks along the entire length of the edge and 5 indicating no cracks. A value of at least about 4 is desired.

Gloss

Gloss of the coatings was determined in accordance with ANSI/ASTM method D523-67 (60° head).

EXAMPLE 1

A reaction vessel fitted with a mechanical stirrer, packed distillation column condenser and provision for heating and for maintenance of an inert gas atmosphere, was flushed with dry nitrogen and charged with the following materials in the order listed:

| | |
|---|---|
| Cardura E ester[1] | 15.845 pbw[2] |
| 1,2 Propylene Glycol | 5.305 pbw |
| Triphenyl Phosphite | 0.299 pbw |
| Neopentyl Glycol | 13.202 pbw |
| Diphenolic Acid | 36.294 pbw |
| Adipic Acid | 18.525 pbw |
| Isophthalic Acid | 10.530 pbw |

[1]glycidyl ester of Versatic acid, Shell Chemical Company, N.Y.
[2]pbw is parts by weight.

A dry nitrogen atmosphere was maintained during the addition of the above ingredients. The resulting mixture was agitated and heated gently until evolution of water vapor begins (reaction temperature of ca. 160° C.). Heat input then was regulated to maintain a distillation column temperature of 101°-103° C. Once the reaction mixture had become homogeneous, aliquots of the reaction mixture were removed periodically and titrated for acid value. Care was taken to maintain the reaction temperature below 260° C. When an acid value of 15-25 was obtained, heating was stopped and the packed column bypassed. After the temperature of the reaction mixture had dropped below 218° C., 3.0 parts by weight of xylene was added at a rate slow enough to avoid overloading of the condenser. Heating was resumed with continuous removal of the xylene-water azeotrope to a maximum reaction temperature of 238° C. After 45 minutes of heating in this manner, periodic removal of aliquots was resumed. These samples were submitted to acid value analyses. When the acid value was under 10, heating was discontinued and asperation vacuum was applied with stirring and cooling. When the reactor temperature had dropped to 150° C., the vacuum was broken, the resin diluted to 70% solids with Cellosolve acetate and filtered. The resin solution had a hydroxyl number of 110+10 and an acid number of 7±5.

EXAMPLE 2

A coating composition using the DPA-capped polyester of Example 1 was formulated into a coating composition with the following ingredients:

| INGREDIENT | PARTS BY WEIGHT (PBW) |
|---|---|
| Resin Mixture | |
| Polyester of Example 1 (70% solids) | 600.00 |
| Cellosolve acetate solvent[1] | 284.00 |
| Methyl ethyl ketone solvent | 172.00 |
| FC-430 surfactant[2] | 4.14 |
| Starfol CG wax[3] | 39.10 |
| TS-100 silica[4] | 34.00 |
| Curing Agent | |
| Mondur HC Isocyanate[5] | 160.00 |
| Desmodur L-2291A Isocyanate[6] | 26.00 |

[1]Cellosolve acetate is ethylene glycol monoethyl ether acetate, Union Carbide Corporation, New York, New York.
[2]FC-430 surfactant is a nonionic fluorocarbon surfactant, Minnesota Mining and Manufacturing Company, St. Paul, Minn., used at 25% in toluene.
[3]Starfol CG wax is a synthetic spermaceti wax (IV of 1.0 max., Acid Value of 2 max., capillary melting point specification of 46-49° C., saponification value of 109-117, alkyl chain length distribution, combined, of 0.5% $C_8$-$C_{10}$, 7.5% $C_{12}$, 18.0% $C_{14}$, 50% $C_{16}$, and 24% $C_{18}$), Sherex Chemical Company, used at 25% in methyl ethyl ketone.
[4]TS-100 silica has an average particle size of 3 microns, Degussa
[5]Mondur HC isocyanate is the tetrafunctional reaction product of hexamethylene diisocyanate and toluene diisocyanate (11.5% NCO content, equivalent weight of 365, 60% solids in Cellosolve acetate/xylene), Mobay Chemical Company, Pittsburg, Pa.
[6]Desmodur L-2291A isocyanate is an aliphatic polyfunctional isocyanate of the hexamethylene diisocyanate biuret type, Mobay Chemical Company, Pittsburg, Pa.

The resin portion of the coating composition was formulated by adding the FC-430 surfactant to the mixture of the polyester, Cellosolve acetate, and methyl ethyl ketone under stirring. The Starfol wax mar aid then was added very slowly at the vortex of the mixture held under vigorous stirring because of its physical incompatibility in the coating composition. Next, the stirring speed was reduced and the TS-100 silica was added to the mixture. Stirring of the mixture continued until a homogeneous mixture was obtained.

The resin mixture (71.83 weight parts) was blended with the isocyanate curing agent mixture (28.15 parts by weight) and the resulting mixture cut with additional methyl ethyl ketone to the desired application viscosity of 125-150 cps (room temperature). The thus-compounded coating composition was applied to glass plates and wood grain vinyl (30.5 cm by 61 cm) supported on glass plate with a Meyer bar to give a 0.1-0.5 mil dry film. The coated substrates were cured by exposure for 20 seconds to vaporous triethylamine catalyst carried by $N_2$ or $CO_2$ carrier gas (about 7% catalyst by volume) in a gas curing chamber. The coated substrates removed from the chamber had cured tack free and could be handled without blocking.

EXAMPLE 3

The coating composition of Example 2 was subjected to performance evaluation in order to demonstrate its outstanding characteristics. The following table displays the viscosity of the coating composition in order to demonstrate the excellent pot life thereof.

| VISCOSITY | |
|---|---|
| Time (Hr.) | Viscosity (cps) |
| Immediate | 149 |
| 2 | 200 |
| 4 | 228 |
| 29 | 371 |
| 48 | 1,265 |
| 72 | 3,600 |

The performance of the cured coating composition on glass and simulated-wood grain vinyl is given below.

| TEST | GLASS | WOOD GRAIN VINYL |
|---|---|---|
| 60° gloss | — | 24 |

-continued

| TEST | GLASS | WOOD GRAIN VINYL |
|---|---|---|
| Mar Resistance | | |
| Fingernail | 4 | 5 |
| Nickel | 3 | 3 |
| O—T Bend | — | 4+ |
| TABER ABRASION INDEX AT | | |
| 100 cycles | — | 13 mg/1000 cycles |
| 200 cycles | — | 60 mg/1000 cycles |
| 300 cycles | — | 48 mg/1000 cycles |

Mar resistance and O-T Bend values of about 3-4 are desired for the cured coating with the vinyl substrate results being more crucial for determining the coating's performance. Taber Abrasion Index resuts are film-thickness dependent. For the extremely thin films used in these examples, it is desirable that the cured coating pass 200-300 cycles without the film being worn away to expose the substrate.

While the nickel cart test is used herein as a measure of the mar-resistance of the cured coating, it is felt that the fingernail test may be a better indication of the mar-resistance and degree of cure of the coating. The subjectivity of the fingernail test, though, can make its results more qualitative. Fingernails are relatively soft material and the fingernail test subjects the coating to a tearing action as well as mar-resistance. A nickel is a relatively hard material to be rubbed across the coating and the nickel cart test tends to be a more quantitative mar-resistance test. Note that the coating of the present invention will pass the paper clip test as other testing has indicated.

The exceptional combination of properties of the coating composition is demonstrated clearly in this example.

EXAMPLE 4

The effect of non-volatile plasticizers on the coating composition was evaluated in this example. The coating composition was formulated from 431.1 weight parts of the resin mixture and 168.9 weight parts of the curing agent of Example 2. To 140 weight parts of this coating composition was added 7, 14, 28, and 56 weight parts of dibutyl phthalate, DBP, (a high-boiling, non-volatile plasticizer). The viscosity of each formulation then was adjusted to 125-150 cps by addition of MEK (methyl ethyl ketone). The formulations each were coated on glass plates and wood grain vinyl supported on glass plate and cured as described in Example 2. The coating characteristics of each formulation are displayed in the following table.

TABLE I

| DBP (wt. %) | Added MEK to Application Viscosity | Viscosity cps, (#4 Ford cup, secs) | Cure (secs.) | 60° Gloss | MAR RESISTANCE | | | | O—T Bend | TABER ABRASION INDEX LOSS IN MGS/1000 CYCLES | | |
|---|---|---|---|---|---|---|---|---|---|---|---|---|
| | | | | | Glass | | Vinyl | | | 100 Cycles | 200 Cycles | 300 Cycles |
| | | | | | Finger Nail | Nickel | Finger Nail | Nickel | | | | |
| 0 | 17 | 138.0 (33.5) | 20 | 22.9 | 4 | 3 | 5 | 3 | 4+ | 38.0 | 57.0 | 56.0 |
| 5 | 19 | 124.0 (30.3) | 20 | 21.5 | 3 | 3 | 4 | 4 | 4+ | 18.0 | 7.5 | 8.0 |
| 10 | 17 | 128.5 (31.8) | 20 | 15.3 | 3 | 3 | 4 | 4 | 5 | 47.0 | 4.0 | — |
| 20 | 15 | 125.5 (31.0) | 30 | 12.9 | 2 | 2 | 3 | 3 | 5 | 28.0 | 32.5 | — |
| 40 | 13 | 100.0 (28.4) | 40 | 6.8 | 1 | cuts to film | 3 | 3 | 5 | 9.0 | 6.5 | — |

The above-tabulated results show that up to about 10% of the non-volatile plasticizer could be incorporated into the coating composition and still retain the mar resistance of the cured film as indicated by the values determined for the vinyl substrate.

EXAMPLE 5

In order to determine the effect of the isocyanate to polyol molar ratio (NCO/OH molar ratio or isocyanate index) on the performance of the coating composition, several batches of the coating were formulated from the resin mixture and curing agent of Example 2. Application of these batches and curing of the applied film were done in the manner described in Example 2. The results obtained are displayed below.

TABLE II

| Isocyanate Index | Resin Mix (pbw) | Isocyanate Curing Agent (pbw) | MAR RESISTANCE | | | | O—T Bend | 60° Gloss | Cure (20 secs) | TABER ABRASION INDEX Loss in mgs/1000 cycles | | |
|---|---|---|---|---|---|---|---|---|---|---|---|---|
| | | | Wood Grain Vinyl | | Glass | | | | | 100 Cycles | 200 Cycles | 300 Cycles |
| | | | Finger Nail | Nickel | Finger Nail | Nickel | | | | | | |
| 1.0 | 73.74 | 26.26 | 5 | 3 | 4 | 3 | 4+ | 17.1 | 4+ | 32.0 | 41.5 | 52.0 |
| 1.1 | 71.85 | 28.15 | 5 | 3 | 4 | 3 | 4+ | 22.9 | 4+ | 38.0 | 57.0 | 56.0 |
| 1.3 | 68.35 | 31.65 | 5 | 3+ | 4 | 3 | 4 | 19.7 | 5 | 30.0 | 32.0 | 38.0 |
| 1.5 | 65.18 | 34.82 | 5 | 3+ | 4+ | 3+ | 4 | 24.5 | 5 | 50.0 | 57.0 | 54.0 |
| 1.7 | 62.29 | 37.71 | 5 | 4 | 4+ | 4 | 4 | 24.2 | 5 | 41.0 | 44.0 | 48.0 |
| 2.0 | 58.4 | 41.6 | 5 | 4+ | 4+ | 4 | 4 | 30.8 | 4 | 74.0 | 55.0 | 47.3 |
| 2.8 | 50.0 | 50.0 | 5 | 4+ | 4 | 3 | 3 | 33.6 | 3 | 17.0 | 20.0 | 29.0 |

The above-tabulated results show that increasing the isocyanate index has little effect on the mar resistance, though some improvement is noticeable, but produces a less flexible film resulting in poorer flexibility. Cure of the coating also becomes less complete at higher isocyanate indices while abrasion resistance is enhanced. Excessive film shrinkage at isocyanate indices of about 1.7 and higher also was noted. Overall, it appears that an isocyanate index of about 1.1-1.3 provides a good balance of all properties of the coating.

EXAMPLE 6

The completeness of curing by vaporous amine catalysts was investigated and especially the effect of post-thermal heating of the cured coatings. The coating composition was formulated from 63.8 pbw of the resin mixture (70% solids) of Example 2, 36.2 pbw of the isocyanate curing agent of Example 2, and 25 pbw of MEK. The coating composition was coated onto pre-weighed glass plates and cured in the manner of Example 2.

The coated plates were subjected to several different cure cycles. The weight of each plate was measured immediately after coating and after the cure cycle. The weight loss due to solvent evaporation and Sward hardnesses were determined at several different times after the cure cycles. The results obtained appear below.

coating between the time it applied and the time it is cured. Though this time interval may be short (e.g. 1–2 minutes), it is conceivable that a significant proportion of the higher volatility solvents in the film are expelled prior to cure.

Note, however, that the coatings subjected to post cure thermal treatment (Samples 2–5) have lower Sward hardnesses than do the coatings exposed only to room temperature treatment after vapor curing.

EXAMPLE 7

Mar Resistance is an important characteristic for the coating composition of the present invention to possess; however, the combination of polyester (polyol) and isocyanate cross-linker does not possess adequate mar resistance. Hence, the need for a mar-resisting aid or additive for inclusion in the coating composition.

TABLE III

| | | Loss (wt. %) | | | | | | Sward Hardness | | | | | |
|---|---|---|---|---|---|---|---|---|---|---|---|---|---|
| Sample | Vapor & Heat Cure Cycle | Immed. | 5 Days | 12 Days | 18 Days | 100 Days | 100 Days + 3 Days at 65° C. | Immed. | 5 Days | 12 Days | 18 Days | 100 Days | 100 Days + 3 Days at 65° C. |
| #1 | 20 sec. TEA + 30 sec RT | 9.8% | 19.3% | 21.6% | 21.4% | 22.1% | 24.7% | 18 | 64 | 72 | 72 | 70 | 70 |
| #2 | 20 sec TEA + 20 Sec RT + 20 sec 80° C. + 20 sec RT | 17.3% | 24.3% | 26.0% | 25.9% | 26.5% | 28.9% | 28 | 62 | 64 | 65 | 66 | 64 |
| #3 | 20 sec TEA + 20 sec RT + 40 sec 80° C. + 20 sec RT | 16.9% | 25.4% | 26.9% | 26.6% | 27.4% | 29.7% | 32 | 62 | 62 | 68 | 66 | 66 |
| #4 | 20 sec TEA + 20 sec RT + 60 sec 80° C. + 20 sec RT | 16.2% | 23.0% | 25.1% | 24.9% | 25.9% | — | 28 | 59 | 58 | 58 | 60 | — |
| #5 | 20 sec TEA + 20 sec RT + 120 sec 80° C. + 20 sec RT | 21.1% | 20.0% | 22.2% | 22.4% | 22.7% | — | 48 | 62 | 58 | 56 | 60 | — |
| #6 | 20 sec TEA + 160 sec RT | 8.9% | 19.9% | 21.9% | 21.8% | 22.7% | — | 26 | 64 | 60 | 72 | 74 | — |

The above-tabulated results reveal several interesting occurrences. While post cure heating resulted in more solvent volatilization from the coating immediately thereafter, within 12–18 days after the cure cycles, the solvent loss due to the heat treatments becomes much less noticeable. Over extended time periods, then, the proportion of solvent in the cured films apparently are about the same whether or not post cure thermal treatments are employed. Unconfirmed in these tests is the proportion of solvent, if any, which volatilizes from the A series of batches of the coating composition was formulated with each batch containing a different mar aid. The coating composition was formulated from 63.79 pbw of the resin mixture of Example 2 (70% n.v. solids) and 10.0 pbw of MEK solvent to which was added the mar aid under consideration. To this mixture was added 36.2 pbw of the isocyanate curing agent of Example 2. The coating composition then was coated and cured in the manner described in Example 2. The following results were obtained.

TABLE IV

| | | | MAR RESISTANCE | | | | | | |
|---|---|---|---|---|---|---|---|---|---|
| | | | Wood Grain Vinyl | | Glass | | | | |
| Supplier | Mar Aid Type | Level (wt. %) | Finger Nail | Nickel | Finger Nail | Nickel | O—T Bend Flexibility | Adhesion | 60° Gloss |
| | Uncoated Vinyl Control | — | 1 | 1 | — | — | 5 | — | 30.8 |
| | No mar aid control | — | 0 | 0 | 0 | 0 | — | good | 95.9 |
| 1 | Starfol CG Surface Treated Silica | 0.75 | 5+ | 4 | 4 | 4 | 2 | good | 42.7 |
| 2 | OK 412 | 2.5 | 5 | 4 | 3 | 4 | 2 | good | 34.3 |
| 2 | OK 412 | 5.0 | 4+ | 4 | 3 | 3 | 2 | fair | 15.9 |
| 2 | LoVel 66X | 5.0 | 2 | — | 1 | — | — | good | 27.0 |
| 2 | LoVel 275 | 5.0 | 4 | — | 2 | — | — | good | 15.9 |
| 1 | Starfol CG | 0.75 | 5+ | 4 | 4 | 4 | 4+ | good | 22.9 |
| 3 | TS-100 | 2.5 | | | | | | | |
| 1 | Starfol CG | 0.75 | 5+ | 5+ | 5+ | 4 | 3 | good | 18.4 |
| 3 | OK 412 | 5.0 | | | | | | | |
| 1 | Starfol CG | 0.75 | 5+ | 5+ | 5+ | 4 | 3 | good | 23.3 |

TABLE IV-continued

| Supplier | Mar Aid Type | Level (wt. %) | MAR RESISTANCE Wood Grain Vinyl Finger Nail | Nickel | Glass Finger Nail | Nickel | O—T Bend Flexibility | Adhesion | 60° Gloss |
|---|---|---|---|---|---|---|---|---|---|
| 3 | LoVel 275 | 5.0 | | | | | | | |
| 4 | Silcron G-500 | 5.0 | 5 | 5+ | 4 | 5 | 1 | good | 41.2 |
| 4 | Silcron G-510 | 5.0 | 5+ | 5+ | 4 | 5 | 2 | good | 41.2 |
| | Silicones | | | | | | | | |
| 5 | DC-11 | 0.5 | 1 | 0 | 2 | 0 | — | fair | 92.2 |
| 5 | DC-56 | 0.1 | 2 | 1 | 2+ | 1 | — | poor | 97.5 |
| 5 | DC-57 | 1.0 | 2 | 3 | 4 | 2 | — | poor | 95.3 |
| 6 | Byk 300 | 0.3 | 2 | 1 | 3 | 2 | — | good | 98.9 |
| 6 | Byk 301 | 0.3 | 3 | 1 | 3— | 2 | — | good | 86.9 |
| | Polyethylenes | | | | | | | | |
| 7 | SL-31 | 3.0 | 1 | 1 | 1 | 0 | — | good | 94.6 |
| 7 | SL-78 | 3.0 | 1 | 1 | 2 | 0 | — | good | 88.4 |
| 7 | SL-133 | 1.0 | 0 | 1 | 2 | 1 | — | good | 90.1 |
| 7 | SL-177 | 4.0 | 1 | 1 | 1 | 1 | — | good | 85.5 |
| 7 | SL-425 | 1.0 | 1 | 1 | 1 | 1 | — | good | 93.6 |
| 8 | Carbowax 20M | 1.0 | 2 | 2 | 1 | 1 | — | good | 73.6 |
| 9 | Raybo Mar Hard 43 | 1.0 | 1 | 1 | 1 | 2 | — | poor | 85.6 |
| 9 | Raybo 3 | 0.2 | 1 | 1 | 0 | 0 | — | good | 90.2 |
| 10 | Troykyd 366 | 0.5 | 1 | 0 | 2 | 0 | — | poor | 98.0 |

1. Sherex Chemical Company, Dublin, Ohio
2. PPG Industries, Pittsburgh, Pa.
3. Degussa, Teterborough, N.J.
4. SCM Corporation, Baltimore, Md.
5. Dow Corning, Midland, Michigan
6. Byk-Mallinckrodt, Dietzenbach-Steinberg, Federal Republic of Germany
7. Daniel Products, Jersey City, N.J.
8. Union Carbide Corporation, New York, N.Y.
9. Raybo Chemical, Huntington, W.Va.
10. Troy Chemicals, Newark, N.J.

The above-tabulated results demonstrate that a mar resistant coating can be obtained using the combination of mar-resisting aid and resin of the present invention. Note that while the silica flatting agent may contribute to mar-resistance, other tests have indicated that use of the preferred mar-aids of the invention will improve mar-resistance of the unflatted coating. The good results of the OK412 silica can be attributed to its surface treatment with a stearate compound, i.e. a mar-aid of the present invention. The Silcron G-500 silica improves mar-resistance only because of its particle size, i.e. 5 microns, which is greater than the thickness of the coating. Flexibility, however, is lacking. In this regard, the poor flexibility of the Starfol CG wax coating is believed to be an anomolous result based on the results for this mar-aid reported in the other examples herein.

EXAMPLE 8

Based on the results obtained in Example 7, further tests were conducted in order to determine whether other long chain aliphatic compounds would serve as mar-resisting aids and whether the compatibility/incompatibility of the mar-resisting aid in the coating composition was a factor important in selecting such aid. The following mar-resisting aid candidates were evaluated:

Sample 1: Starfol CG Wax of Example 7.
Sample 2: Standamul 1616 brand of cetyl palmitate of Henkel Coproration, Hoboken, N.J.
Sample 3: Acrawax C brand of N,N'-ethylene bis-stearamide (5–8 microns average particle size) of Glyco Chemicals, Inc., Greenwich, Conn.
Sample 4: Cyclochem SPS brand of synthetic spermacetti wax of Cyclo Chemicals Corp., Miami, Fla.
Sample 5: Kessco 653 brand of cetyl palmitate of Armak Company, Chicago, Ill.
Sample 6: Kessco 654 brand of cetyl palmitate of Armak Company (supra).
Sample 7: Cyclochem PETS brand of pentaerythritol tetrastearate of Cyclo Chemicals Corp (supra)
Sample 8: Isopropyl myristate supplied by Sherex Chemical Company, Dublin, Oh.
Sample 9: Kessco isocetyl stearate supplied by Armak Company (supra)
Sample 10: Kessco brand of butoxyethyl stearate supplied by Armak Company (supra)

Coatings formulations were compounded from the resin of Example 1, coated and cured in the manner described in Example 2. The following results were obtained:

TABLE V

| Sample No. | Slip/Mar Aid | 60° Gloss | Mar Resistance Glass Finger Nail | Nickel | Vinyl Finger Nail | Nickel | O—T Bend | Taber Abrasion Index Loss in mgs/1000 cycles 100 Cycles | 200 Cycles | 300 Cycles | Comment |
|---|---|---|---|---|---|---|---|---|---|---|---|
| 1 | Starfol CG | 22.9 | 4 | 3 | 5 | 3 | 4+ | 38.0 | 57.0 | 56.0 | Incompatible |
| 2 | Standamul 1616 (Cetyl Palmitate) | 14.3 | 4 | 3 | 5 | 3 | 5 | 27.0 | 19.0 | 39.0 | Incompatible |
| 3 | Acrawax C Atomized | 15.1 | 3 | 3 | 4+ | 3 | 5 | 81.0 | 80.0 | 81.9 | Incompatible |
| 4 | Cyclochem | 12.1 | 2 | 2 | 5 | 3 | 5 | 41.0 | 48.5 | 55.0 | Incompatible |

TABLE V-continued

| Sample No. | Slip/Mar Aid | 60° Gloss | Mar Resistance | | | | O—T Bend | Taber Abrasion Index Loss in mgs/1000 cycles | | | Comment |
| | | | Glass | | Vinyl | | | | | | |
| | | | Finger Nail | Nickel | Finger Nail | Nickel | | 100 Cycles | 200 Cycles | 300 Cycles | |
|---|---|---|---|---|---|---|---|---|---|---|---|
| | SPS (Synthetic spermaceti) | | | | | | | | | (900) | |
| 5 | KESSCO 653 (Cetyl Palmitate) | 11.7 | 2 | 2 | 5 | 3 | 5 | 32.0 | 48.0 | 54.0 (400) | Incompatible |
| 6 | KESSCO 654 (Cetyl Myristate) | 11.6 | 2 | 2 | 3 | 2 | 5 | 45.0 | 59.0 | 57.0 (400) | Incompatible |
| 7 | Cyclochem PETS (Pentaerythintol Tetrastearate) | 11.2 | 1 | 1 | 3 | 3 | 5 | 38.0 | 52.0 | — | Partially compatible |
| 8 | Isopropyl Myristate | 9.5 | 0 | 0 | 1 | 1 | 5 | — | — | — | Compatible |
| 9 | KESSCO Isocetyl stearate | 16.1 | 3+ | 3 | 2 | 2 | 5 | 117.0 | 84.5 | 66.0 (700) | Compatible |
| 10 | KESSCO Butoxyethyl stearate | 12.1 | 2 | 2 | 1 | 1 | 5 | 46.0 | 63.0 | — | Compatible |

The above-tabulated results show that the incompatible mar-aids generally provided acceptable mar-resistance especially on vinyl. Clearly, the compatible mar-aids failed to impart acceptable mar-resistance to the coating composition.

EXAMPLE 9

Use of aliphatic multi-isocyanate cross-linking agents leads to protracted curing times. In order to demonstrate the need for an effective proportion of aromatic isocyanate functionality, a series of batches of the resin mixture of Example 2 were cured with several isocyanate curing agents which differed in aromatic/aliphatic isocyanate content. Each batch was formulated at an isocyanate index of 1.1, coated, and cured in the manner of Example 2. The following coating composition formulations were evaluated.

TABLE VI

| SAMPLE | Polyol Blend (pbw) | ISOCYANATE COMPOSITION (pbw) | | MEK (pbw) | ISOCYANATE CONTENT (wt %) | |
| | | Mondur[1] HC | Desmodur[2] N-100 | | Aromatic | Aliphatic |
|---|---|---|---|---|---|---|
| 4 | 118.6 | 7.9 | 23.6 | 28.5 | 9.9 | 10.1 |
| 5 | 121.6 | | 28.4 | 30.0 | 0 | 100 |

[1] See Example 2.
[2] Desmodur N-100 is a biuret of hexamethylene diisocyanate (22.0% NCO, equivalent weight of 190), Mobay Chemical Company, Pittsburgh, Pennsylvania.

The proportion of aromatic and aliphatic isocyanate in the Mondur HC agent was assumed to be 60:40 by weight, respectively. These estimated proportions are based upon public information from their supplier. While these proportions are believed to be accurate within about 5% or less of the true proportions, it should be understood that these values are estimated and may not be precise. For present purposes of illustrating the invention, it is believed that they are adequately accurate.

Using the coating compositions given above, the following results were obtained.

TABLE VII

| Sample No. | NV Solids | Cure Time (sec.) | Viscosity, cps (#4 Ford Cup secs.) | | | 60° Gloss | MAR RESISTANCE | | | | | | O.T. Bend Flexibility | Taber Abrasion Index Loss in mgs/1000 Cycles | | |
| | | | | | | | Glass | | | Vinyl | | | | | | |
| | | | Initial | 1 hr | 24 hr | | Finger Nail | Nickel | Adhesion | Finger Nail | Nickel | Adhesion | | 100 Cycles | 200 Cycles | 300 Cycles |
|---|---|---|---|---|---|---|---|---|---|---|---|---|---|---|---|---|
| 1 | 47.6 | 20 | 138 (33.5) | 163 | 236 | 23.6 | 4 | 3 | good | 5 | 5 | good | 4+ | 31.0 | 42.5 | 43.2 |
| 2 | 49.3 | 20 | 140.5 (33.0) | 155 | 225 | 20.1 | 4 | 3 | good | 5 | 5 | good | 5 | 13.0 | 28.0 | 34.3 |
| 3 | 50.8 | 20 | 146.5 (34.5) | 167 | 228 | 20.4 | 4 | 3 | fair | 4 | 4 | good | 5 | 35.0 | 37.0 | 37.9 |
| 4 | 51.6 | 30 | 146.0 (34.5) | 158.5 | 208 | 18.3 | 3 | 3 | fair | 4 | 4 | good | 5 | 18.0 | 35.0 | — |
| 5 | 52.1 | 60 | 135.5 (33) | 154 | 206 | 22.6 | 4 | 4 | fair | 5 | 5 | good | 5 | 53.0 | 73.0 | — |

| | | | | | | |
|---|---|---|---|---|---|---|
| 1 | 103.6 | 46.4 | — | 25.5 | 60 | 40 |
| 2 | 110.0 | 30.0 | 10.1 | 27.0 | 38.4 | 61.6 |
| 3 | 114.8 | 17.6 | 17.6 | 27.0 | 22.5 | 77.5 |

The above-tabulated results demonstrate that an effective proportion of aromatic isocyanate content must be present in the curing agent in order to achieve rapid cure at room temperature.

EXAMPLE 10

Four additional polyol-polyester resins were synthesized in the manner described in Example 1 from the following ingredients:

| Ingredients | SAMPLE NO. (moles) | | | |
|---|---|---|---|---|
| | 186 | 189 | 187 | 188 |
| Isophthalic Acid | 1.0 | 2.0 | 4.0 | 6.0 |
| Adipic Acid | 2.0 | 2.0 | 2.0 | 3.0 |
| Cardura E ester | 1.0 | 1.0 | 2.0 | 3.0 |
| Neopentyl glycol | 2.0 | 2.0 | 4.0 | 6.0 |
| 1,2-Propylene glycol | 1.1 | 1.1 | 1.1 | 1.1 |
| Diphenolic Acid | 2.0 | 2.0 | 2.0 | 2.0 |

The diphenolic acid was added as a separate ingredient after the other ingredients were reacted. Gel Permeation Chromatography (GPC) analysis revealed the following information on samples 187, 188, and 189.

| Sample No. | $\overline{M}_w$ | $\overline{M}_n$ | Dispersivity $\left(\dfrac{\overline{M}_w}{\overline{M}_n}\right)$ |
|---|---|---|---|
| 189 | 2550 | 1500 | 1.70 |
| 187 | 4100 | 2000 | 2.04 |
| 188 | 6500 | 2700 | 2.40 |

Sample 187 has about twice the weight average molecular weight, and sample 188 has about three times the weight average molecular weight of sample 189 (and sample 186).

Coating compositions, sans mar-resisting agent and flatting agent, were formulated to an isocyanate index of 1.1 as follows:

| Ingredient | Sample No. (gms) | | | |
|---|---|---|---|---|
| | 186 | 189 | 187 | 188 |
| Resin | 51.0 | 51.5 | 80.15 | 108.9 |
| Curing Agent[1] | 40.2 | 40.2 | 40.2 | 40.2 |
| Cellosolve Acetate | 35.0 | 35.0 | 60.0 | 70.0 |

[1]Isocyanate mixture of Example 2.

The samples were each coated onto glass plates and cured in the manner of Example 2. All of the coating composition samples maintained acceptable viscosities in the pot after 24 hours. None of the samples possessed adequate fingernail mar resistance since no mar-resisting aid was included in the formulations, but each cured as indicated by their ribboning when a sharp knife was passed over the cured films. The Sward hardness and MEK rub results for each coating is given below.

| | SAMPLE NO. | | | | | | | |
|---|---|---|---|---|---|---|---|---|
| | 186 | | 189 | | 187 | | 188 | |
| TEST | RT[1] | HT[2] | RT | HT | RT | HT | RT | HT |
| Cure time (sec) | 30 | | 30 | | 100 | | 110 | |
| SWARD[3] | 50 | 56 | 46 | 62 | 38 | 40 | 34 | 42 |
| MEK RUB[4] | 100+ | 100+ | 100+ | 100+ | 60 | 53 | 18 | 19 |

[1]Room temperature
[2]Samples held at 160° C. for 5 minutes, then allowed to cool for 3 days prior to testing.
[3]Plate glass is defined as 100 for Sward hardness and the coating should have a value of at least 35, preferably 40.
[4]Methyl ethyl ketone (MEK) wetted rag rubbed over one area of cured film with moderate thumb pressure until glass substrate is visible. This test is a measure of the degree of cure of the coating composition.

While the above-tabulated results tend to indicate the acceptability of Sample No. 187 and not of Sample No. 188, further evaluation was undertaken in order to confirm such results. Thus, the resins of Sample Nos. 187 and 188 were formulated into complete coating compositions and compared to the inventive coating composition of Example 2. The polyol blends used are as follows:

| Ingredient | Sample Nos. 187 and 188 (gms.) |
|---|---|
| Resin Solution (70% solids in Cellosolve acetate) | 382.3 |
| Cellosolve acetate solvent | 166.0 |
| FC-430 Surfactant | 2.7 |
| Starfol CG Wax | 26.8 |
| TS-100 Silica | 22.8 |

Using the isocyanate curing agent blend of Example 2, the coating compositions for Sample Nos. 187 and 188 were formulated at an isocyanate index of 1.1 as follows:

| Ingredient | Sample No. (gms.) | |
|---|---|---|
| | 187 | 188 |
| Polyol Blend | 109.1 | 118.2 |
| Curing Agent Blend | 40.9 | 31.8 |
| MED Solvent | 22.5 | 25.5 |

All three coating compositions were formulated at the same equivalent weight of the polyol resin so that the coating compositions' characteristics should be primarily a function of their different weight-molecular weight (or chain length). The following results were obtained:

TABLE VIII

| Sample No. | Viscosity (CPS) | | | | | | Cure Time (sec.) | Mar resistance | | | | O—T Bend Flexibility | Taber Abrasion Index Loss in Mgs/1000 cycles | | |
|---|---|---|---|---|---|---|---|---|---|---|---|---|---|---|---|
| | | | | | | | | Glass | | Vinyl | | | | | |
| | Initial | 2 hr. | 4 hr. | 24 hr. | 48 hr. | 72 hr. | | Finger Nail | Nickel | Finger Nail | Nickel | | 100 Cycles | 200 Cycles | 300 Cycles |
| Ex. 2 | 149 | 200 | 228 | 371 | 1265 | 3600 | 20 | 4 | 3 | 5 | 3 | 4+ | 13 | 60 | 48 |
| 187 | 135 | 135 | 140 | 205 | — | 248 | 60 | 1 | 1 | 3 | 3 | 5 | 41 | 56 | — |

TABLE VIII-continued

| Sample No. | Viscosity (CPS) | | | | | | Cure Time (sec.) | Mar resistance | | | | O—T Bend Flexibility | Taber Abrasion Index Loss in Mgs/1000 cycles | | |
|---|---|---|---|---|---|---|---|---|---|---|---|---|---|---|---|
| | | | | | | | | Glass | | Vinyl | | | | | |
| | Initial | 2 hr. | 4 hr. | 24 hr. | 48 hr. | 72 hr. | | Finger Nail | Nickel | Finger Nail | Nickel | | 100 Cycles | 200 Cycles | 300 Cycles |
| 188 | 100 | 105 | 116 | 190 | — | 286 | 90 | 0 | 1 | 1 | 2 | 5 | 96 | 97 | — |

The above-tabulated results show that the preferred resin and a resin with about twice the weight—molecular weight are sufficiently tough to find use in the coating composition of the present invention. The resin with three time the molecular weight of the preferred resin, however, is too low in cohesive strength to find use in the coating composition of the present invention.

EXAMPLE 11

Several variations of the polyol-polyester were compounded into coating compositions (sans mar-resisting aid and flatting agent) and evaluated. The evaluation of the coatings without mar-resisting agent in this example determines pot life, cure time, and degree of cure that the particular resin displays. Mar resistance, though lacking here, can be achieved by inclusion of the mar aids disclosed herein. The polyesters were synthesized in the manner described in Example 1 and compounded into coating compositions substantially the same as the coating composition described in Example 2, except as noted herein, using the isocyanate curing agent mixture of Example 2 at an isocyanate index of 1.1. The polyesters evaluated were synthesized from the following ingredients:

| INGREDIENT | SAMPLE NO. (moles) | | | | | |
|---|---|---|---|---|---|---|
| | 1 | 2 | 3 | 4 | 5 | 6 |
| Adipic Acid | — | 2 | 2 | 2 | 2 | 2 |
| Azelaic Acid | 2 | — | — | — | — | — |
| iso-Phthalic Acid | 1 | 1 | 1 | 1 | 1 | 1 |
| Di-Phenolic Acid | 2 | 2 | 2 | 2 | — | — |
| Bisphenol Acetic Acid | — | — | — | — | 2 | — |
| p-Hydroxyphenyl Acetic Acid | — | — | — | — | — | 2 |
| neo-Pentyl Glycol | 2 | 2 | 2 | — | 2 | 2 |
| Cyclohexane Dimethanol | — | — | — | 2 | — | — |
| Propylene Glycol | 1.1 | 1.1 | 1.1 | 1.1 | 1.1 | 1.1 |
| Cardura E | 1 | — | — | 1 | 1 | 1 |
| Vikolox 15-18[1] α Olefin | — | 1 | — | — | — | — |
| Epoxide $C_{16}$[2] | — | — | 1 | — | — | — |

[1]Vikolox 15-18 is an epoxide mixture derived from a mixture of $C_{15}$-$C_{18}$ alpha-olefins, Viking Chemical Co., Minneapolis, Minn.
[2]α-Olefin Epoxide $C_{16}$ is an epoxide derived from a $C_{16}$ alpha-olefin, Union Carbide Corp., New York, N.Y.

Each coating composition was formulated as follows:

| INGREDIENT | Sample No. (gms) | | | | | |
|---|---|---|---|---|---|---|
| | 1 | 2 | 3 | 4 | 5 | 6 |
| Resin | 44.9 | 51.1 | 65.5 | 52.2 | 39.5 | 75.8 |
| Curing Agent[1] | 40.2 | 40.2 | 40.2 | 40.2 | 40.2 | 40.2 |
| Cellosolve Acetate | 35.0 | 35.0 | 40.0 | 35.0 | 35.0 | 30.0 |

[1]Curing agent of Example 2.

The results obtained for the above-tabulated six samples coated and cured on glass plates are displayed below.

TABLE IX

| Test[1] Sample No. | Viscosity, cps | | | | | Cure Time (sec.) | Sward Hardness | | MEK Rub | |
|---|---|---|---|---|---|---|---|---|---|---|
| | Initial | 4 hr | 24 hr | 48 hr | 72 hr | | RT | HT | RT | HT |
| 1 | 85 | 112.5 | 144 | 210 | 260 | 20 | 56 | 64 | 100+ | 100+ |
| 2 | 155 | 244 | 361.5 | 605 | 842 | 20 | 48 | 62 | 100+ | 100+ |
| 3 | 150 | 241 | 350 | 577 | 768 | 30 | 50 | 56 | 100+ | 100+ |
| 4 | 180 | 257.5 | 323 | 473 | 595 | 10 | 56 | 68 | 100+ | 100+ |
| 5 | 93.5 | 125 | 170.5 | 246 | 309 | 10 | 64 | 66 | 100+ | 100+ |
| 6 | 136 | 153.5 | 225 | 285.5 | 304 | 40 | 52 | 60 | 22 | 25 |

[1]Test details described in Example 10.

The above-tabulated results demonstrate several aspects of the present invention. Sample 1 demonstrates that a different linear aliphatic dibasic acid (other than adipic acid in Example 1) is beneficial to the performance of the coating composition. Samples 2 and 3 show two different diol or mono-epoxide compounds having pendant hydrocarbyl groups which also work in the coating composition. Sample 4 shows another shielded diol which works in the polyester resin. Finally, Samples 5 and 6 show different phenol-functional carboxylic acids which may be used to cap the polyester resin.

EXAMPLE 12

Based on the good performance exhibited by the coatings of Example 11, Samples Nos. 1, 3 and 5 were subjected to more rigorous evaluation along with a coating composition formulated from a different batch of the resin of Example 1 (identified as Sample No. A.). The isocyanate index was 1.1 for all coatings. The following results were obtained.

TABLE X

| | MAR RESISTANCE | |
|---|---|---|
| | Glass | Vinyl |

TABLE X-continued

| Sample No. | % Solids | Viscosity, cps | | | | | 60° Gloss | Finger Nail | Nickel | Finger Nail | Nickel |
|---|---|---|---|---|---|---|---|---|---|---|---|
| | | Initial | 4 hr | 30 hr | 96 hr | 8 days | | | | | |
| A | 39.04 | 105 | 113 | 177 | — | Gelled | 22.9 | 4 | 3 | 5 | 3 |
| 1 | 46.5 | 116.5 | 140.0 | 160.0 | 497.0 | Gelled | 12.5 | 3 | 3 | 5 | 4 |
| 3 | 43.6 | 97.5 | 119.0 | 132.5 | Rubbery film on top | — | 20.1 | 4 | 3 | 3 | 3 |
| 5 | 46.3 | 125.0 | 152.5 | 187.5 | 595.0 | Gelled | 10.3 | 4 | 4 | 5 | 4 |

| Sample | Adhesion | | O—T Bend | Taber Abrasion Index Loss in Mgs/1000 Cycles | | |
|---|---|---|---|---|---|---|
| | Glass | Vinyl | | 100 Cycles | 200 Cycles | 300 Cycles |
| A | fair | good | 4+ | 38.0 | 57.0 | 56.0 |
| 1 | fair | good | 5 | 7.0 | 19.5 | 23.0 |
| 3 | fair | good | 5 | 3.0 | 16.5 | 26.9 |
| 5 | fair | good | 5 | 38.0 | 30.5 | 35.3 |

The excellent performance exhibited by the coating compositions of the present invention again are demonstrated by the above-tabulated results.

I claim:

1. A composite article comprising a flexible substrate having an adherent cured film of a curable coating composition thereon, said film at a thickness of between about 0.1 and 0.5 mils possessing a flexibility sufficient for a O-T bend on metal and a mar resistance of at least about 2000 gms as borne by the edge of a nickel passed over said cured film, said film being the cured residue of said coating composition after exposure to a vaporous tertiary amine catalyst, said coating composition comprising:

(A) an aromatic hydroxyl-functional condensation product having an acid number of less than about 10 and made by condensing the following ingredients in the indicated molar proportions or double thereof except for the phenolic-functional carboxylic acid:
   (1) between about 1 and 2 moles of a $C_2$–$C_{12}$ linear aliphatic dibasic acid,
   (2) between about 1 and 2 moles of an ortho or meta aromatic dicarboxylic acid or anhydride thereof,
   (3) between about 1 and 4 moles of a $C_2$–$C_6$ alkylene glycol,
   (4) between about 1 and 2 moles of a sterically hindered diol,
   (5) between about 1 and 2 moles of a mono-epoxide or diol having a pendant $C_8$–$C_{22}$ hydrocarbyl group, and
   (6) between about 1 and 2 moles of a phenolic-functional carboxylic acid;

(B) a multi-isocyanate comprising:
   (1) between about 10 and 80 percent by weight of an aromatic multi-isocyanate, and
   (2) between about 90 and 20 percent by weight of an aliphatic multi-isocyanate;

(C) a volatile oganic solvent for such condensation product and for said multi-isocyanate, and (D) a mar-resisting agent of an organic compound physically incompatible in said coating composition and having an effective chain length of at least about 12 carbon atoms;

the ratio of aromatic hydroxyl equivalents of said condensation product to the isocyanate equivalents of said multi-isocyanate being between about 1:1 and 1:1.7, said condensation product containing substantially no aliphatic hydroxyl groups, and said condensation product having a phenol functionality of at least 2.

2. The composite article of claim 1 wherein said condensation product is made by condensing:
   (1) between 1 and 2 moles of adipic acid,
   (2) between 1 and 2 moles of isophthalic acid,
   (3) between 1 and 4 moles of propylene glycol,
   (4) between 1 and 2 moles of neopentyl glycol,
   (5) between 1 and 2 moles of an epoxy-ester having pendant hydrocarbyl groups, and
   (6) between 1 and 2 moles of a diphenolic-type acid.

3. The composite article of claim 1 or 2 wherein said diphenolic-type acid is represented by

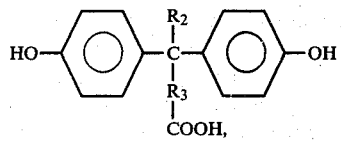

where
$R_1$ is H or $C_1$–$C_8$ alkyl group, and
$R_3$ is a sigma bond or a $C_1$–$C_8$ polymethylene group.

4. The composite article of claim 3 wherein said condensation product is made by condensing:
   (1) 2 moles of adipic acid,
   (2) 1 mole of isophthalic acid,
   (3) 1 mole of propylene glycol,
   (4) 2 moles of neopentyl glycol,
   (5) 1 mole of said epoxy-ester, and
   (6) 2 moles of said diphenolic-type acid.

5. The composite article of claim 3 wherein for said diphenolic acid,
$R_2$=$CH_3$, and
$R_3$——$CH_2$—$CH_2$—.

6. The composite article of claim 1 wherein the proportion of said mar-resisting agent is between about 0.5% and 1.0% by weight and said agent is an ester of a $C_{12}$–$C_{30}$ carboxylic acid.

7. The composite article of claim 1 wherein said solvent is a mixture of ketones, esters, and organic solvents.

8. The composite article of claim 1 wherein said flexible substrate is a thermoplastic substrate.

9. A flexible coated substrated prepared by the method which comprises:
   (I) applying said coating composition to said flexible substrate, said coating composition having a pot life of at least about 4 hours in an open pot and comprising:

(A) an aromatic hydroxyl-functional condensation product having an acid number of less than about 10, having an aromatic hydroxyl-functionality of at least 2, and containing substantially no aliphatic hydroxyl groups, said condensation product made by condensing the following ingredients in the indicated molar proportions or double thereof except for the phenol-functional carboxylic acid:

(1) between about 3 and 8 moles of a mixture of diols which include a sterically hindered diol, and a diol or mono-epoxide which provides a pendant $C_8-C_{22}$ hydrocarbyl group; and (2) between about 3 and 6 moles of a mixture of a linear aliphatic dibasic acid and an ortho or meta aromatic dicarboxylic acid, and a phenol-functional carboxylic acid having at least one carbon atom between said phenol group and said carboxyl group;

(B) a multi-isocyanate cross-linking agent comprising a mixture of between about 10% and 80% by weight of an aromatic multi-isocyanate and between about 90% and 20% by weight of an aliphatic multi-isocyanate, wherein the ratio of aromatic hydroxyl equivalents from said condensation product to the isocyanate equivalents of said multi-isocyanate ranges from between about 1:1 and 1:1.7;

(C) a volatile organic solvent for said condensation product and for said multi-isocyanate; and (D) a mar-resisting agent of an organic long chain fatty compound physically incompatible in said coating composition and having an effective chain length of at least 12 carbon atoms;

(II) exposing said coated flexible substrate to a vaporous tertiary amine catalyst to rapidly cure said coating at about room temperature;

said cured coating having a film thickness of between about 0.1 and about 0.5 mils;

said cured film of said coating composition possessing a flexibility sufficient for a zero-T bend on metal and a mar resistance of at least about 2,000 grams as borne by the edge of a nickel passed over said cured film.

10. The flexible coated substrate of claim 9 wherein said condensation product is made by condensing the following ingredients or double thereof except for said phenol-functional carboxylic acid:

(a) between about 1 and 2 moles of a $C_2-C_{12}$ linear aliphatic dibasic acid, (b) between about 1 and 2 moles of said ortho or meta dicarboxylic acid, (c) between about 1 and 4 moles of a $C_2-C_6$ alkylene glycol, (d) between about 1 and 2 moles of said sterically hindered diol, (e) between about 1 and 2 moles of said mono-epoxide or diol having a pendant $C_8-C_{22}$ hydrocarbyl group, and (f) between about 1 and 2 moles of said phenol-functional carboxylic acid.

11. The flexible coated substrate of claim 10 wherein said condensation product is made by condensing the following ingredients in the indicated molar proportions or double thereof except for said phenol-functional carboxylic acid:

(a) between 1 and 2 moles of adipic acid,
(b) between 1 and 2 moles of isophthalic acid,
(c) between 1 and 4 moles of propylene glycol,
(d) between 1 and 2 moles of neopentyl glycol,
(e) between 1 and 2 moles of an epoxide of a $C_8-C_{22}$ mono-olefin or a 1,2-glycol containing a $C_8-C_{22}$ hydrocarbyl group, and
(f) between 1 and 2 moles of said phenol-functional carboxylic acid represented by

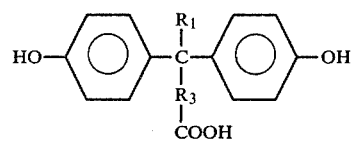

where $R_1$ is H or a $C_1-C_8$ alkyl group, and $R_3$ is a sigma bond or a $C_1-C_8$ polymethylene group.

12. The flexible coated substrate of claim 9 or 11 wherein said cured film on said flexible coated substrate is heat-embossed.

13. The flexible coated substrate of claim 9 or 11 wherein said substrate is thermoplastic.

14. The flexible coated substrate of claim 11 wherein said coating composition additionally contains between about 2.5% and 10% by weight of the non-volatile solids of a silica flatting agent having a mean particle size of about 3 microns.

* * * * *